(12) United States Patent
Calixte et al.

(10) Patent No.: US 10,451,894 B2
(45) Date of Patent: Oct. 22, 2019

(54) METHOD FOR COMPARING A FIRST OPHTHALMIC LENS WITH A SECOND OPHTHALMIC LENS

(71) Applicant: ESSILOR INTERNATIONAL (COMPAGNIE GENERALE D'OPTIQUE), Charenton-le-pont (FR)

(72) Inventors: Laurent Calixte, Charenton-le-pont (FR); Farid Karioty, Charenton-le-pont (FR); Marie-Gaelle Froeliger, Charenton-le-pont (FR); Cedric Goulard, Charenton-le-pont (FR); Aude Contet, Charenton-le-pont (FR); Bruno Doucin, Charenton-le-pont (FR); Fanny Ferre, Charenton-le-pont (FR)

(73) Assignee: ESSILOR INTERNATIONAL, Charenton-le-pont (FR)

( * ) Notice: Subject to any disclaimer, the term of this patent is extended or adjusted under 35 U.S.C. 154(b) by 0 days.

(21) Appl. No.: 15/536,864

(22) PCT Filed: Dec. 23, 2015

(86) PCT No.: PCT/EP2015/080952
§ 371 (c)(1),
(2) Date: Jun. 16, 2017

(87) PCT Pub. No.: WO2016/102553
PCT Pub. Date: Jun. 30, 2016

(65) Prior Publication Data
US 2017/0351114 A1    Dec. 7, 2017

(30) Foreign Application Priority Data
Dec. 23, 2014 (EP) .................................. 14307162

(51) Int. Cl.
*G02C 3/00* (2006.01)
*G02C 7/02* (2006.01)
(Continued)

(52) U.S. Cl.
CPC ............. *G02C 7/027* (2013.01); *G02C 7/024* (2013.01); *G02C 7/061* (2013.01); *G02C 7/028* (2013.01)

(58) Field of Classification Search
CPC ... G02C 7/02; G02C 5/00; G02C 7/08; G02C 7/06; G02C 7/061; G02C 7/04; A61B 3/1005
(Continued)

(56) References Cited

U.S. PATENT DOCUMENTS

| 2012/0188504 A1* | 7/2012 | Petignaud | G02C 7/024 351/159.74 |
| 2012/0203368 A1* | 8/2012 | Altheimer | G02C 7/027 700/103 |

OTHER PUBLICATIONS

B. Bourdoncle, et al., International Lens Design Conference of SPIE—The International Society for Optical Engineering, Jun. 11-14, 1990, pp. 194-199, vol. 1354.

* cited by examiner

*Primary Examiner* — Dawayne Pinkney
(74) *Attorney, Agent, or Firm* — Young & Thompson

(57) ABSTRACT

Disclosed is a method for comparing first and second ophthalmic lenses, including:
a first optical function providing step, during which a first optical function of a first ophthalmic lens LI is provided, the first optical function including at least a first set of values of an optical parameter Gj, the values of the first set of values corresponding to the values of the optical parameter of the first ophthalmic lens in a set of gaze directions, (Continued)

a similar second optical function providing step directed to a second ophthalmic lens L2, a subsets determining step, during which at least a first and a second subset of gaze directions are selected, a comparison step for each subset of gaze directions, an assignment step, during which a subset status is assigned to each subset of gaze directions, the subset status being selected among at least three levels.

17 Claims, 6 Drawing Sheets

(51) Int. Cl.
  *G02C 7/00* (2006.01)
  *G02C 7/06* (2006.01)

(58) Field of Classification Search
  USPC ...... 351/159.76, 159.75, 41, 159.01, 159.39,
   351/159.41, 159.42, 159.71, 159.72,
   351/159.73, 159.74, 159.77, 159.78,
   351/159.79
  See application file for complete search history.

METHOD FOR COMPARING A FIRST OPHTHALMIC LENS WITH A SECOND OPHTHALMIC LENS

FIELD OF THE INVENTION

The invention relates to a method, for example implemented by computer means, for comparing a first ophthalmic lens with a second ophthalmic lens and to a lens ordering system comprising a processing unit adapted to implement the comparing method according to the invention.

BACKGROUND OF THE INVENTION

Usually, the evaluation of the quality of ophthalmic lenses on the entire lens area or the comparison of two ophthalmic lenses is done by focimeter mesurements at the control points. The evaluation of the quality of the opthalmic lenses may be done globally by experts and therefore depend on the human factor.

Furthermore, the quality evaluation methods do not consider the wearing conditions of the ophthalmic lenses.

One object of the present invention is to provide an objective method for comparing at least two ophthalmic lenses that provides results similar to the comparison obtained by experts but without the human dependent factor.

SUMMARY OF THE INVENTION

To this end, the invention proposes a method, for example implemented by computer means, for comparing a first ophthalmic lens with a second ophthalmic lens, the method comprising:
- a first optical function providing step, during which a first optical function of a first ophthalmic lens L1 is provided, the first optical function comprising at least a first set of values of an optical parameter (P1,1; P1,2, . . . , P1,n), the values of the first set of values corresponding to the values of said optical parameter of the first ophthalmic lens in a set of gaze directions $((\alpha 1,\beta 1); (\alpha 2,\beta 2); \ldots ; (\alpha n,\beta n))$,
- a second optical function providing step, during which a second optical function of a second ophthalmic lens L2 is provided, the second optical function comprising at least a second set of values of the optical parameter (P2,1; P2,2, . . . , P2,n), the values of the second set of values corresponding to the values of said optical parameter of the second ophthalmic lens in the set of gaze directions $((\alpha 1,\beta 1); (\alpha 2,\beta 2); \ldots ; (\alpha n,\beta n))$,
- a subsets determining step, during which at least a first and a second subset of gaze directions are selected within the set of gaze directions, each subset of gaze direction comprising at least two gaze directions specific to said subset,
- a comparison step, during which for each subset of gaze directions the value of the optical parameter of the first and second optical function are compared using a comparison function associated with said optical parameter,
- an assignment step, during which a subset status is assigned to each subset of gaze directions, the subset status being based on the comparison of the value of the comparison function with at least two threshold values T1 and T2 associated with said optical parameter, wherein the subset status is selected among at least three levels.

Advantageously, the method according to the invention allows an objective comparison of two ophthalmic lenses based on at least one optical parameter in a set of gaze directions. Therefore, the method according to the invention is independent of human factor and allows comparing two ophthalmic lenses from a wearer's point of view.

According to further embodiments which can be considered alone or in combination:
- the optical parameter Pi is selected in the list consisting of the wearer power, oblique astigmatism, the unwanted astigmatism, distortion, magnification, prismatic deviation, acuity loss; and/or
- the first and second optical functions are wearer optical functions defined in specific wearing condition and the gaze directions are defined from the center of rotation of the eye of the wearer; and/or
- the first and second optical functions are wearer optical functions defined in specific wearing conditions and the optical parameter is a binocular optical parameter; and/or
- the at least first and second subset of gaze directions, for example all the subsets of gaze directions, comprise no common gaze directions; and/or
- the comparison function is a monotonically increasing function of the difference between the first and second optical functions; and/or
- during the comparison step, each subset of gaze directions the value of the optical parameter of the first and second optical function are compared using:

a. $Ccomp = Ceval[|Pj((\alpha i,\beta i);L1) - Pj((\alpha i,\beta i);L2)|]$, or b. $Ccomp = |Ceval[Pj((\alpha i,\beta i);L1)] - Ceval[Pj((\alpha i,\beta i);L2)]|$ wherein $C_{eval}$ is selected among the standard deviation function, the mean function, the peak to valley function, the maximum function and the Root Mean Square function; and/or
- at least one of the first and second lens are intended to be worn by a wearer; and/or
- each of the first and second lens are virtual lenses; and/or
- the method further comprise a global status assignment step during which a global status is assigned for the set of gaze directions, the global status being dependent on each of the subsets status according to a predetermined rule; and/or
- the method further comprise a frame contour $C_f(\alpha,\beta)$ providing step, wherein each of the subset of gaze direction is comprised within the frame contour $C_f(\alpha, \beta)$;
- at least one subset of gaze direction comprises gaze directions in the vicinity of the central vision zone; and/or
- the first and second ophthalmic lenses are progressive addition lenses and at least one subset of gaze direction comprises gaze directions in the vicinity of the meridian line; and/or
- each of the gaze direction of the set is associated to one subset of gaze directions.

According to a further aspect, the invention relates to a method for manufacturing an ophthalmic lens comprising a comparison step according to the invention wherein the first ophthalmic lens is a manufactured lens and the second ophthalmic lens is a theoretical lens.

The invention further relates to a lens manufacturing system comprising a manufacturing device adapted to manufacture an ophthalmic lens and a comparison device adapted to implement the method for comparing the manufactured lens with a theoretical lens according to the invention. The lens manufacturing system may comprise a lens measuring device adapted to measure the manufactured lens. The lens measuring device may be comprised in the manufacturing device or in the comparison device or may be an independent device.

The invention also relates to a lens ordering system comprising a processing unit adapted to implement the comparing method according to the invention and a display unit configured to display the comparison result.

The invention further relates to a computer program product comprising one or more stored sequences of instructions that are accessible to a processor and which, when executed by the processor, causes the processor to carry out the steps of the methods according to the invention.

The invention also relates to a computer-readable storage medium having a program recorded thereon; where the program makes the computer execute the method of the invention.

The invention further relates to a device comprising a processor adapted to store one or more sequence of instructions and to carry out at least one of the steps of the method according to the invention.

Unless specifically stated otherwise, as apparent from the following discussions, it is appreciated that throughout the specification discussions utilizing terms such as "computing", "calculating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Embodiments of the invention will now be described, by way of example only, and with reference to the following drawings in which.

DETAILED DESCRIPTION OF PREFERRED EMBODIMENTS

Figure 1:
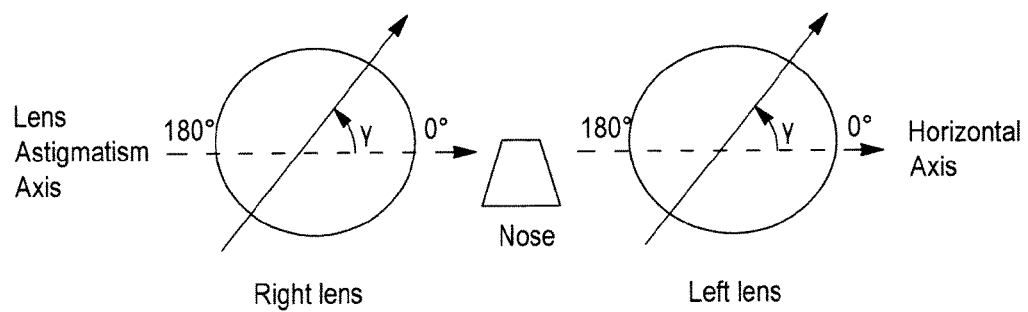
FIG. 1 illustrates the astigmatism axis γ of a lens in the TABO convention.

In the sense of the invention, an optical function corresponds to a function providing for each gaze direction the effect of an optical lens on the light ray passing through the optical lens.

The optical function may comprise dioptric function, light absorption, polarizing capability, reinforcement of contrast capacity, etc. . . . . .

The dioptric function corresponds to the optical lens power (mean power, astigmatism etc. . . . ) as a function of the gaze direction.

The wording "optical design" is a widely used wording known from the man skilled in the art in ophthalmic domain to designate the set of parameters allowing to define a dioptric function of an ophthalmic lens; each ophthalmic lens designer has its own designs, particularly for progressive ophthalmic lenses. As for an example, a progressive ophthalmic lens "design" results of an optimization of a progressive surface so as to restore a presbyope's ability to see clearly at all distances but also to optimally respect all physiological visual functions such as foveal vision, extra-foveal vision, binocular vision and to minimize unwanted astigmatisms. For example, a progressive lens design comprises:

a power profile along the main gaze directions (meridian line) used by the lens wearer during day life activities, distributions of powers (mean power, astigmatism, . . . ) on the sides of the lens, that is to say away from the main gaze direction.

These optical characteristics are part of the "designs" defined and calculated by ophthalmic lens designers and that are provided with the progressive lenses.

Although the invention is not limited to progressive lenses, the wording used is illustrated in FIGS. 1 to 10 for a progressive lens. The skilled person can adapted the definitions in case of single vision lenses.

A progressive lens comprises at least one but preferably two non-rotationally symmetrical aspheric surfaces, for instance but not limited to, progressive surface, regressive surface, toric or atoric surfaces.

As is known, a minimum curvature $CURV_{min}$ is defined at any point on an aspherical surface by the formula:

$$CURV_{min} = \frac{1}{R_{max}}$$

where $R_{max}$ is the local maximum radius of curvature, expressed in meters and $CURV_{min}$ is expressed in dioptres.

Similarly, a maximum curvature $CURV_{max}$ can be defined at any point on an aspheric surface by the formula:

$$CURV_{max} = \frac{1}{R_{min}}$$

where $R_{min}$ is the local minimum radius of curvature, expressed in meters and $CURV_{max}$ is expressed in dioptres.

It can be noticed that when the surface is locally spherical, the local minimum radius of curvature $R_{min}$ and the local maximum radius of curvature $R_{max}$ are the same and, accordingly, the minimum and maximum curvatures $CURV_{min}$ and $CURV_{max}$ are also identical. When the surface is aspherical, the local minimum radius of curvature $R_{min}$ and the local maximum radius of curvature $R_{max}$ are different.

From these expressions of the minimum and maximum curvatures $CURV_{min}$ and $CURV_{max}$, the minimum and maximum spheres labeled $SPH_{min}$ and $SPH_{max}$ can be deduced according to the kind of surface considered.

When the surface considered is the object side surface (also referred to as the front surface), the expressions are the following:

$$SPH_{min} = (n-1)*CURV_{min} = \frac{n-1}{R_{max}} \text{ and } SPH_{max} = (n-1)*CURV_{max} = \frac{n-1}{R_{min}}$$

where n is the index of the constituent material of the lens.

If the surface considered is an eyeball side surface (also referred to as the back surface), the expressions are the following:

$$SPH_{min} = (1-n)*CURV_{min} = \frac{1-n}{R_{max}} \text{ and } SPH_{max} = (1-n)*CURV_{max} = \frac{1-n}{R_{min}}$$

where n is the index of the constituent material of the lens.

As is well known, a mean sphere $SPH_{mean}$ at any point on an aspherical surface can also be defined by the formula:

$$SPH_{mean} = \frac{1}{2}(SPH_{min} + SPH_{max})$$

The expression of the mean sphere therefore depends on the surface considered:

if the surface is the object side surface, $$SPH_{mean} = \frac{n-1}{2}\left(\frac{1}{R_{min}} + \frac{1}{R_{max}}\right)$$

if the surface is an eyeball side surface, $$SPH_{mean} = \frac{1-n}{2}\left(\frac{1}{R_{min}} + \frac{1}{R_{max}}\right)$$

A cylinder CYL is also defined by the formula $CYL=|SPH_{max}-SPH_{min}|$.

The characteristics of any aspherical face of the lens may be expressed by the local mean spheres and cylinders. A surface can be considered as locally aspherical when the cylinder is at least 0.25 diopters.

Figure 2:
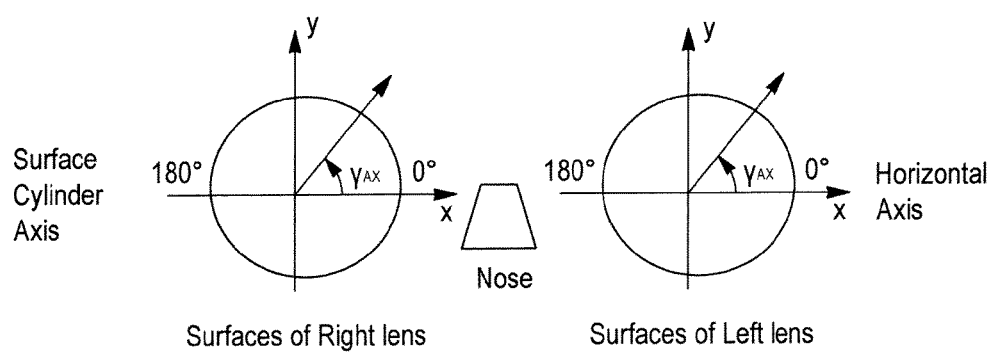
FIG. 2 illustrates the cylinder axis $\gamma_{AX}$ in a convention used to characterize an aspherical surface.

For an aspherical surface, a local cylinder axis $\gamma_{AX}$ may further be defined. FIG. 1 illustrates the astigmatism axis $\gamma$ as defined in the TABO convention and FIG. 2 illustrates the cylinder axis $\gamma_{AX}$ in a convention defined to characterize an aspherical surface.

The cylinder axis $\gamma_{AX}$ is the angle of the orientation of the maximum curvature $CURV_{max}$ with relation to a reference axis and in the chosen sense of rotation. In the above defined convention, the reference axis is horizontal (the angle of this reference axis is 0°) and the sense of rotation is counter-clockwise for each eye, when looking at the wearer (0°$\delta\gamma_{AX}\delta$180°). An axis value for the cylinder axis $\gamma_{AX}$ of +45° therefore represents an axis oriented obliquely, which when looking at the wearer, extends from the quadrant located up on the right to the quadrant located down on the left.

Moreover, a progressive multifocal lens may also be defined by optical characteristics, taking into consideration the situation of the person wearing the lenses.

Figure 3:
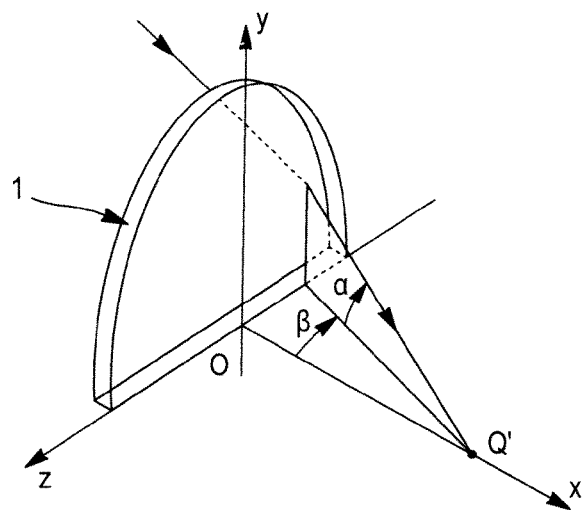
FIGS. 3 and 4 show, diagrammatically, optical systems of eye and lens.
Figure 4:
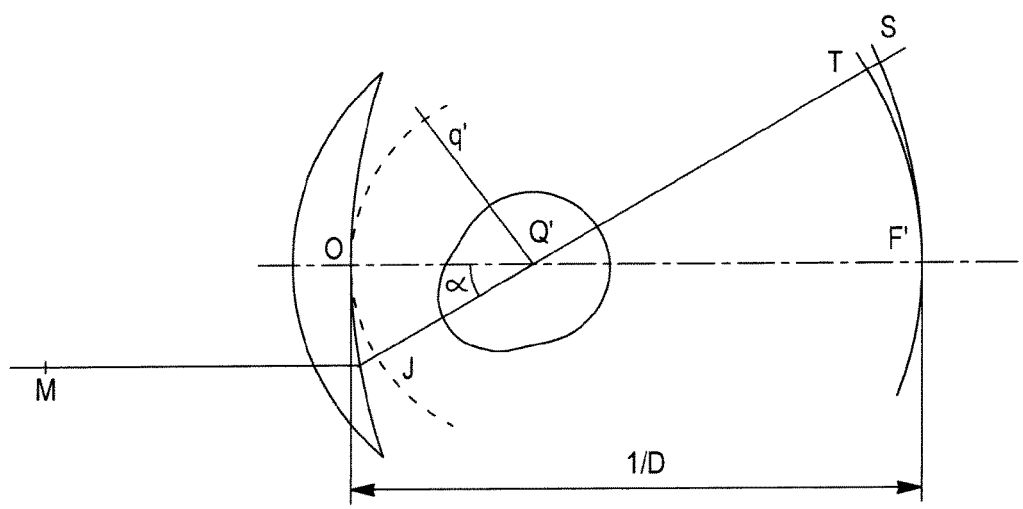

FIGS. 3 and 4 are diagrammatic illustrations of optical systems of eye and lens, thus showing the definitions used in the description. More precisely, FIG. 3 represents a perspective view of such a system illustrating parameters α and β used to define a gaze direction. FIG. 4 is a view in the vertical plane parallel to the antero-posterior axis of the wearer's head and passing through the center of rotation of the eye in the case when the parameter β is equal to 0.

The center of rotation of the eye is labeled Q'. The axis Q'F', shown on FIG. 4 in a dot-dash line, is the horizontal axis passing through the center of rotation of the eye and extending in front of the wearer—that is the axis Q'F' corresponding to the primary gaze view. This axis cuts the aspherical surface of the lens on a point called the fitting cross, which is present on lenses to enable the positioning of lenses in a frame by an optician. The point of intersection of the rear surface of the lens and the axis Q'F' is the point O. O can be the fitting cross if it is located on the rear surface. An apex sphere, of center Q', and of radius q', is tangential to the rear surface of the lens in a point of the horizontal axis. As examples, a value of radius q' of 25.5 mm corresponds to a usual value and provides satisfying results when wearing the lenses.

A given gaze direction—represented by a solid line on FIG. 3—corresponds to a position of the eye in rotation around Q' and to a point J of the apex sphere; the angle β is the angle formed between the axis Q'F' and the projection of the straight line Q'J on the horizontal plane comprising the axis Q'F'; this angle appears on the scheme on FIG. 3. The angle α is the angle formed between the axis Q'J and the projection of the straight line Q'J on the horizontal plane comprising the axis Q'F'; this angle appears on the scheme on FIGS. 3 and 4. A given gaze view thus corresponds to a point J of the apex sphere or to a couple (α,β). The more the value of the lowering gaze angle is positive, the more the gaze is lowering and the more the value is negative, the more the gaze is rising.

In a given gaze direction, the image of a point M in the object space, located at a given object distance, is formed between two points S and T corresponding to minimum and maximum distances JS and JT, which would be the sagittal and tangential local focal lengths. The image of a point in the object space at infinity is formed, at the point F'. The distance D corresponds to the rear frontal plane of the lens.

Ergorama is a function associating to each gaze direction the usual distance of an object point. Typically, in far vision following the primary gaze direction, the object point is at infinity. In near vision, following a gaze direction essentially corresponding to an angle α of the order of 35° and to an angle β of the order of 5° in absolute value toward the nasal side, the object distance is of the order of 30 to 50 cm. For more details concerning a possible definition of an ergorama, U.S. Pat. No. 6,318,859 may be considered. This document describes an ergorama, its definition and its modeling method. For a method of the invention, points may be at infinity or not. Ergorama may be a function of the wearer's ametropia or wearer's addition.

Using these elements, it is possible to define a wearer optical power and astigmatism, in each gaze direction. An object point M at an object distance given by the ergorama is considered for a gaze direction (α,β). An object proximity ProxO is defined for the point M on the corresponding light ray in the object space as the inverse of the distance MJ between point M and point J of the apex sphere:

$$ProxO = 1/MJ$$

This enables to calculate the object proximity within a thin lens approximation for all points of the apex sphere, which is used for the determination of the ergorama. For a real lens, the object proximity can be considered as the inverse of the distance between the object point and the front surface of the lens, on the corresponding light ray.

For the same gaze direction (α,β), the image of a point M having a given object proximity is formed between two points S and T which correspond respectively to minimal and maximal focal distances (which would be sagittal and tangential focal distances). The quantity ProxI is called image proximity of the point M:

$$ProxI = \frac{1}{2}\left(\frac{1}{JT} + \frac{1}{JS}\right)$$

By analogy with the case of a thin lens, it can therefore be defined, for a given gaze direction and for a given object proximity, i.e. for a point of the object space on the corresponding light ray, an optical power Pui as the sum of the image proximity and the object proximity.

$$Pui = ProxO + ProxI$$

With the same notations, an astigmatism Ast is defined for every gaze direction and for a given object proximity as:

$$Ast = \left|\frac{1}{JT} - \frac{1}{JS}\right|$$

This definition corresponds to the astigmatism of a ray beam created by the lens. It can be noticed that the definition gives, in the primary gaze direction, the classical value of astigmatism. The astigmatism angle, usually called axis, is the angle α. The angle α is measured in the frame $\{Q', x_m, y_m, z_m\}$ linked to the eye. It corresponds to the angle with which the image S or T i formed depending on the convention used with relation to the direction $z_m$ in the plane $\{Q', z_m, y_m\}$.

Possible definitions of the optical power and the astigmatism of the lens, in the wearing conditions, can thus be calculated as explained in the article by B. Bourdoncle et al., entitled "Ray tracing through progressive ophthalmic lenses", 1990 International Lens Design Conference, D. T. Moore ed., Proc. Soc. Photo. Opt. Instrum. Eng.

Figure 5:
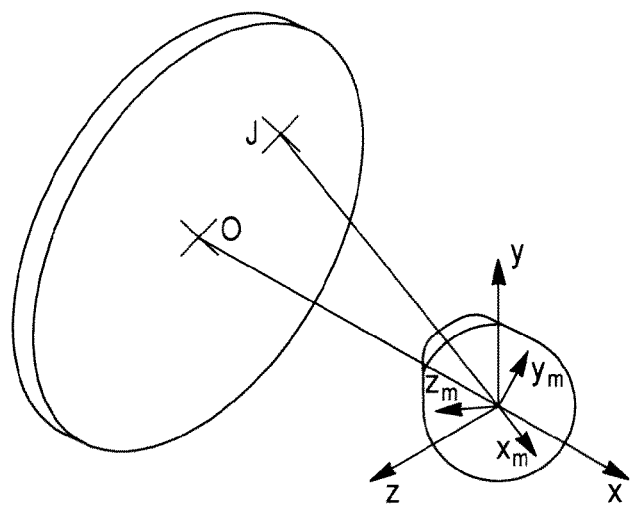
FIG. 5 shows a ray tracing from the center of rotation of the eye.

FIG. 5 represents a perspective view of a configuration wherein the parameters α and β are non zero. The effect of rotation of the eye can thus be illustrated by showing a fixed frame $\{x, y, z\}$ and a frame $\{x_m, y_m, z_m\}$ linked to the eye. Frame $\{x, y, z\}$ has its origin at the point Q'. The axis x is the axis Q'O and it is oriented from the lens toward the eye. The y axis is vertical and oriented upwardly. The z axis is such that the frame $\{x, y, z\}$ be orthonormal and direct. The frame $\{x_m, y_m, z_m\}$ is linked to the eye and its center is the point Q'. The $x_m$ axis corresponds to the gaze direction JQ'. Thus, for a primary gaze direction, the two frames $\{x, y, z\}$ and $\{x_m, y_m, z_m\}$ are the same. It is known that the properties for a lens may be expressed in several different ways and notably in surface and optically. A surface characterization is thus equivalent to an optical characterization. In the case of a blank, only a surface characterization may be used. It has to be understood that an optical characterization requires that the lens has been machined to the wearer's prescription. In contrast, in the case of an ophthalmic lens, the characterization may be of a surface or optical kind, both characterizations enabling to describe the same object from two different points of view. Whenever the characterization of the lens is of optical kind, it refers to the ergorama-eye-lens system described above. For simplicity, the term 'lens' is used in the description but it has to be understood as the 'ergorama-eye-lens system'.

The values in optic terms can be expressed for gaze directions. Gaze directions are usually given by their degree of lowering and azimuth in a frame whose origin is the center of rotation of the eye. When the lens is mounted in front of the eye, a point called the fitting cross is placed before the pupil or before the eye rotation center Q' of the eye for a primary gaze direction. The primary gaze direction corresponds to the situation where a wearer is looking straight ahead. In the chosen frame, the fitting cross corresponds thus to a lowering angle α of 0° and an azimuth angle β of 0° whatever surface of the lens the fitting cross is positioned—rear surface or front surface.

The above description made with reference to FIGS. 3-5 was given for central vision. In peripheral vision, as the gaze direction is fixed, the center of the pupil is considered instead of center of rotation of the eye and peripheral ray directions are considered instead of gaze directions. When peripheral vision is considered, angle α and angle β correspond to ray directions instead of gaze directions.

In the remainder of the description, terms like «up», «bottom», «horizontal», «vertical», «above», «below», or other words indicating relative position may be used. These terms are to be understood in the wearing conditions of the lens. Notably, the "upper" part of the lens corresponds to a negative lowering angle α<0° and the "lower" part of the lens corresponds to a positive lowering angle α>0°. Similarly, the "upper" part of the surface of a lens—or of a semi-finished lens blank—corresponds to a positive value along the y axis, and preferably to a value along the y axis superior to the y_value at the fitting cross and the "lower" part of the surface of a lens—or of a semi-finished lens blank—corresponds to a negative value along the y axis in the frame, and preferably to a value along the y axis inferior to the y_value at the fitting cross.

Figure 6:
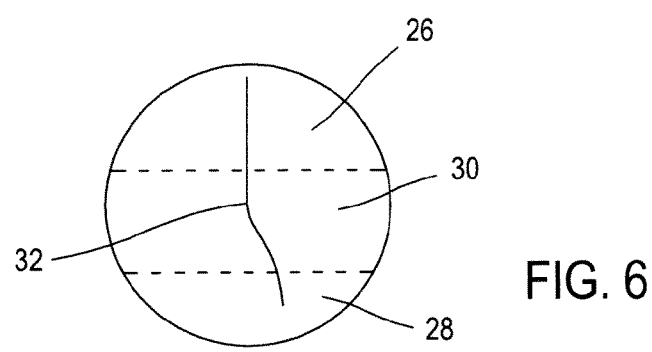
FIGS. 6 and 7 show field vision zones of a lens.
Figure 7:
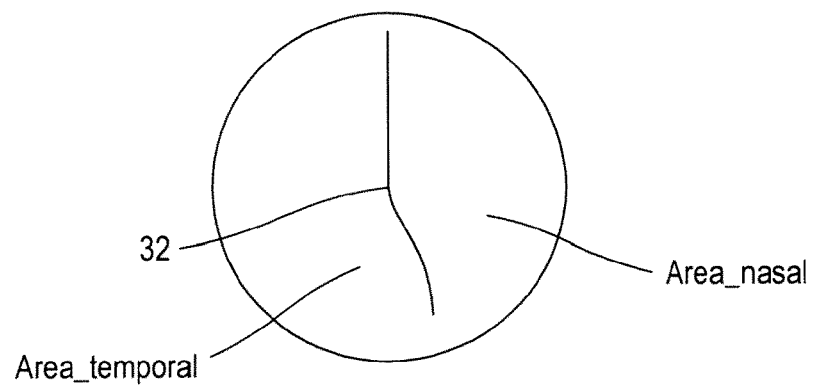

The visual field zones seen through a lens are schematically illustrated in FIGS. 6 and 7. The lens comprises a far vision zone 26 located in the upper part of the lens, a near vision zone 28 located in the lower part of the lens and an intermediate zone 30 situated in the lower part of the lens between the far vision zone 26 and the near vision zone 28. The lens also has a main meridian 32 passing through the three zones and defining a nasal side and a temporal side.

For the purpose of the invention, the meridian line 32 of a progressive lens is defined as follow: for each lowering of the view of an angle $\alpha=\alpha_1$ between the gaze direction corresponding to the fitting cross and a gaze direction being in the near vision zone, the gaze direction $(\alpha_1,\beta_1)$ is searched for which the local residual astigmatism is minimum. Thus, all the gaze directions defined in that way form the meridian line of the ergorama-eye-lens system. The meridian line of the lens represents the locus of mean gaze directions of a wearer when he is looking from far to near visions. The meridian line 32 of a surface of the lens is defined as follows: each gaze direction $(\alpha,\beta)$ belonging to the optical meridian line of the lens intersects the surface at a point (x,y). The meridian line of the surface is the set of points corresponding to the gaze directions of the meridian line of the lens.

As shown in FIG. 7, the meridian 32 separates the lens into a nasal area and a temporal area. As expected, the nasal area is the area of the lens which is between the meridian and the nose of the wearer whereas the temporal area is the area which is between the meridian and the temple of the wearer. The nasal area is labeled Area_nasal and the temporal area is labeled Area_temporal, as it will in the remainder of the description.

The invention may apply to the distortion. Distortion is a defect which is not related to the resolution of images impacting the sharpness or the contrast of the image formed by the periphery of the visual field of the lens but merely to their shape. In ophthalmic optics, "barrel" distortion occurs with minus lenses whereas "pin-cushion" distortion occurs with plus lenses; these are inherent in the optical characteristics of simple plus or minus lenses. Distortion can be evaluated in different situations of use of the lens.

Figure 8:
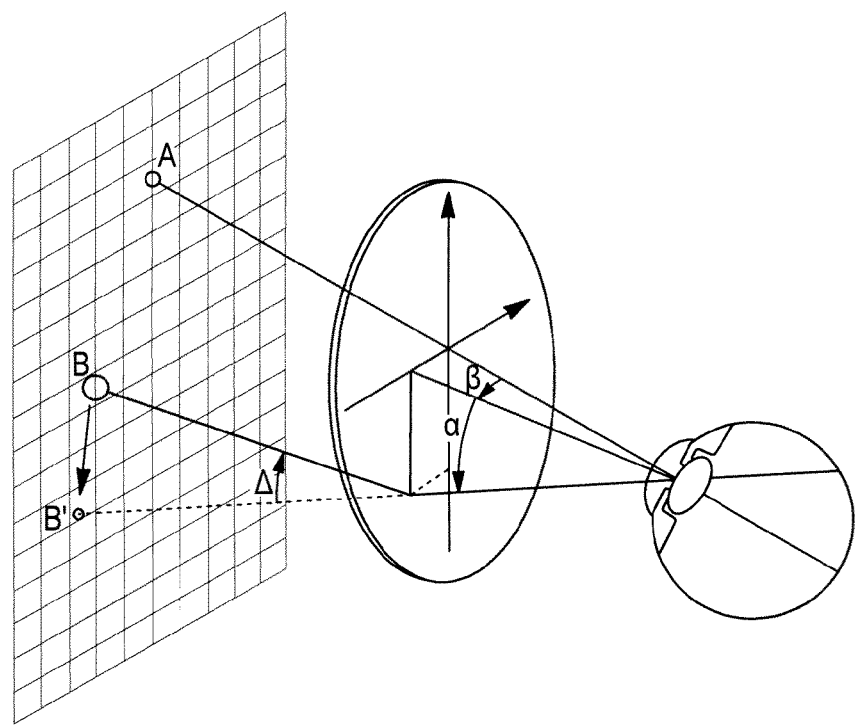
FIGS. 8, 9 and 10 show the effect of distortion in static vision and ways to quantify this phenomenon.
Figure 9:
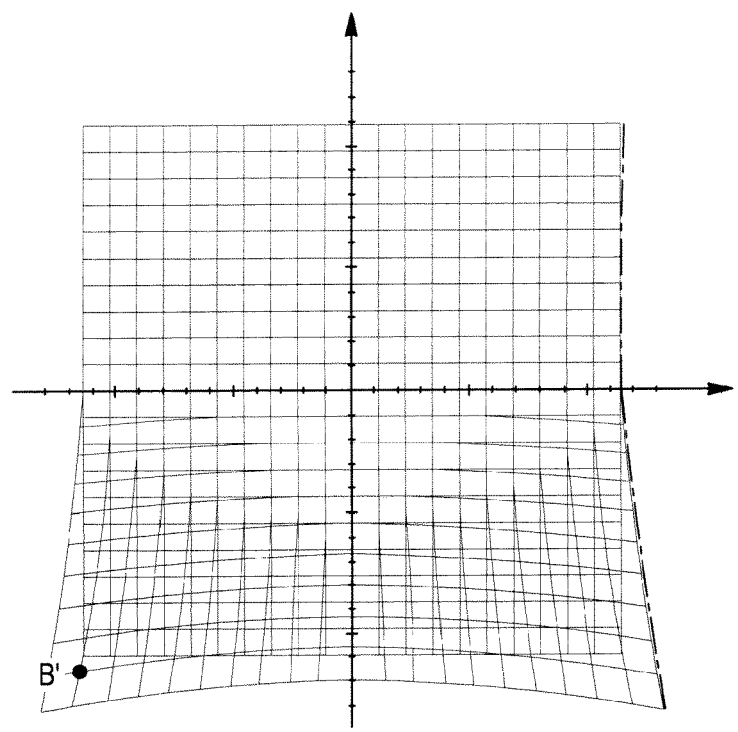
Figure 10:
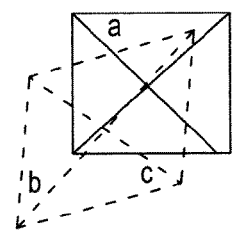

First, a fixation point is imposed to the wearer so that he keeps his eye immobile (thus the gaze direction is fixed). In this case, the distortion which is evaluated is called static distortion and it is evaluated in peripheral vision (named also indirect vision). FIG. 8 illustrates the effect of distortion along a ray seen by a viewer in his peripheral field of vision after passing through a lens. Thus, while the wearer is looking at a point A in central vision, some peripheral points such as point B are also seen. Due to prismatic deviation, the wearer has the feeling that the object point is at B' and not at point B. The angle A is a quantitative way of expressing the prismatic deviation which gives to the wearer the illusion that point B is located at point B'. Several quantities can be calculated to evaluate distortion. For instance, we can quantify how a vertical and/or a horizontal line of an object grid seen in the peripheral vision as being curved, as shown in FIG. 9. In this figure, the grid (solid lines) seen without the lens and which is not deformed is superimposed with the distorted grid (broken lines) seen through the lens. Therefore, it becomes apparent that the distortion has an impact on peripheral vision. Moreover, it also appears that the distortion can be quantified by calculating how a peripheral square is deformed. For this calculation, FIG. 10 is an enlarged view of one square of the grid seen without the lens over which is superimposed the deformed square of the deformed grid seen through the lens. The square has two diagonals whose lengths are labeled a. Thus, the division of the length of each diagonal is a/a=1 in the case of the square of the grid seen without the lens. The corresponding deformed square has two diagonals whose lengths are different and are respectively labeled b and c, b corresponding to a diagonal longer than c. For this deformed square b/c is different from 1. The more this ratio is greater than 1, the greater is the distortion in this area of the lens. Calculating the ratio of the diagonal is thus a way of quantifying distortion.

Distortion can also be evaluated considering that the eye is moving behind the lens and this kind of distortion is named dynamic distortion. It appears in the periphery of the central visual field and it is evaluated in central vision (named also direct vision).

Thus distortion can be evaluated in static vision, i.e. the direction of gaze is fixed and distortion is analyzed in peripheral vision. Distortion can also be evaluated in dynamic vision, i.e. the direction of gaze is free and distortion is analyzed in central vision. Evaluation in static or dynamic vision is made depending on the intended use of the lens. Reference can be made to publication «La distortion en optique de lunetterie» by Yves LE GRAND Annales d'Optique Oculaire 5ème année No 1 Janvier 1956.

The invention relates to a method, for example implemented by computer means, for comparing a first ophthalmic lens with a second ophthalmic lens.

According to a first embodiment of the invention, at least one of the two ophthalmic lenses compared is an ophthalmic lens intended to be worn by a wearer.

Typically, when manufacturing an ophthalmic lens the optical properties may differ from the nominal value defined by a reference virtual ophthalmic lens.

The method of the invention may be used to compare the so called "target ophthalmic lens" corresponding to the nominal virtual ophthalmic lens with a manufactured ophthalmic lens. Based on the result of the comparison, one may decide that the manufactured lens is acceptable or not based on an objective comparison for different optical parameters and different vision zone of the ophthalmic lens.

According to a second embodiment of the invention, each of the first and second ophthalmic lenses are virtual lenses.

Typically, ophthalmic lens designers may wish to slightly modify the optical design of an ophthalmic lens, for example to take into consideration parameters of the wearer of wishes of the wearer.

The method of the invention may be used to compare at least one optical property of a first virtual ophthalmic lens corresponding to an initial design with a second virtual ophthalmic lens corresponding to a modified design.

Based on the result of the comparison, the ophthalmic lens designer may decide that the modified design is acceptable or not based on an objective comparison for different optical parameters and different vision zone of the ophthalmic lens.

Figure 11:
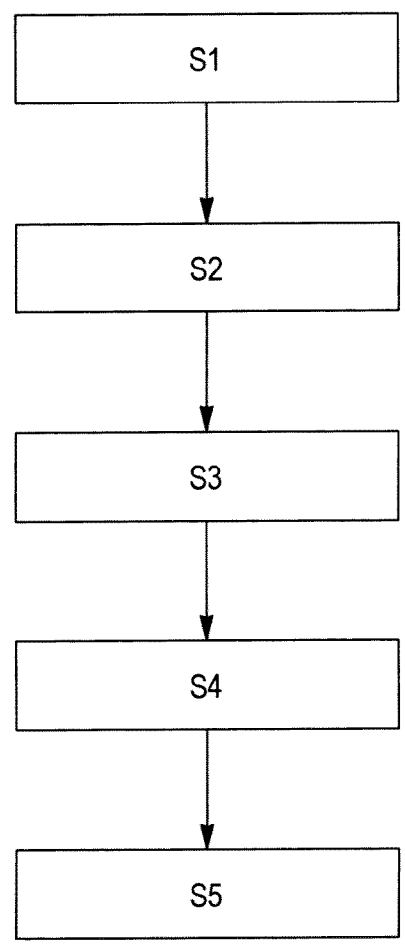
FIG. 11 is an illustration of a chart-flow of an embodiment of the method according to the invention.

As represented on FIG. 11, the method according to the invention comprises at least:
 a first optical function providing step S1,
 a second optical function providing step S2,
 a subsets determining step S3,
 a comparison step S4, and
 an assignment step S5.

During the first optical function providing step S1 a first optical function of a first ophthalmic lens L1 is provided. The first optical function comprises at least a first set of values of an optical parameter (P1,1; P1,2, . . . , P1,n). The values of the first set of values corresponding to the values of said optical parameter of the first ophthalmic lens in a set of gaze directions $((\alpha_1,\beta_1); (\alpha_2,\beta_2); \ldots ; (\alpha_n,\beta_n))$.

During the second optical function providing step S2 a second optical function of a second ophthalmic lens L2 is provided. The second optical function comprises at least a second set of values of the optical parameter (P2,1;

P2,2, . . . , P2,n). The values of the second set of values correspond to the values of said optical parameter of the second ophthalmic lens in the set of gaze directions ((α1, β1); (α2,β2); . . . ; (αn,βn)).

The at least one optical parameter of the second set of values is the same as the at least one optical parameter of the first set of values and are determined in the same gaze directions ((α1,β1); (α2,β2); . . . ; (αn,βn)).

The at least one optical parameter may be selected in the list consisting of the wearer power, oblique astigmatism, the unwanted astigmatism, distortion, magnification, prism deviation, acuity loss.

According to an embodiment of the invention, the first and second optical functions are wearer optical functions defined in specific wearing conditions.

The wearing conditions are to be understood as the position of the ophthalmic lens with relation to the eye of a wearer, for example defined by a pantoscopic angle, a Cornea to lens distance, a Pupil-cornea distance, a CRE to pupil distance, a CRE to lens distance and a wrap angle.

The Cornea to lens distance is the distance along the visual axis of the eye in the primary position (usually taken to be the horizontal) between the cornea and the back surface of the lens; for example equal to 12 mm.

The Pupil-cornea distance is the distance along the visual axis of the eye between its pupil and cornea; usually equal to 2 mm.

The CRE to pupil distance is the distance along the visual axis of the eye between its center of rotation (CRE) and cornea; for example equal to 11.5 mm.

The CRE to lens distance is the distance along the visual axis of the eye in the primary position (usually taken to be the horizontal) between the CRE of the eye and the back surface of the lens, for example equal to 25.5 mm.

The Pantoscopic angle is the angle in the vertical plane, at the intersection between the back surface of the lens and the visual axis of the eye in the primary position (usually taken to be the horizontal), between the normal to the back surface of the lens and the visual axis of the eye in the primary position; for example equal to −8°.

The wrap angle is the angle in the horizontal plane, at the intersection between the back surface of the lens and the visual axis of the eye in the primary position (usually taken to be the horizontal), between the normal to the back surface of the lens and the visual axis of the eye in the primary position for example equal to 0°.

An example of wearer condition may be defined by a pantoscopic angle of −8°, a Cornea to lens distance of 12 mm, a Pupil-cornea distance of 2 mm, a CRE to pupil distance of 11.5 mm, a CRE to lens distance of 25.5 mm and a wrap angle of 0°.

Other conditions may be used. Wearing conditions may be calculated from a ray-tracing program, for a given lens.

As indicated previously, the gaze directions are usually defined from the center of rotation of the eye of the wearer.

According to an embodiment of the invention, the first and second optical functions are wearer optical functions defined in specific wearing conditions and the at least one optical parameter is a binocular optical parameter.

According to an embodiment of the invention, the optical gaze directions is defined from the center of Cyclops eye of the wearer.

For example the invention may relate to a method of comparing two optical equipment E1 and E2 intended to be worn by a wearer.

Each optical equipment comprises right and left lenses positioned in front of each eye of the wearer in specific wearing conditions. Both eyes of the center of rotation are positioned relative to each other via the binocular frame.

For each of the first and second optical equipment binocular optical functions are determined for at least one binocular optical parameter defined in the binocular frame calculated for a set of binocular gaze direction (called "cyclopean gaze direction").

Examples of binocular frame and binocular optical parameters are given in published applications WO2011/061267 and WO2011/061268.

During the subsets determining step S3, at least a first and a second subset of gaze directions are selected within the set of gaze directions, each subset of gaze direction comprising at least two gaze directions specific to said subset.

According to a preferred embodiment of the invention the at least first and second subset of gaze directions comprise no common gaze directions. In other words the at least first and second subset of gaze directions do not overlap one another.

According to an embodiment of the invention, each of the gaze direction of the set is associated to one subset of gaze directions. In other words all of the gaze directions of the set of gaze directions considered in the first are part of at least one subset of gaze direction. Preferably, each of the gaze directions is part of one and only one subset of gaze directions.

According to an embodiment of the invention, at least one of the first and second ophthalmic lenses is intended to be mounted in a spectacle frame worn by a wearer. According to such embodiment, the method may comprise a frame contour providing step during which data indicative of the contour Cf of a frame, for example chosen by the wearer or otherwise selected, is provided.

The contour of the frame is preferably expressed in terms of gaze directions, i.e. Cf(α,β) based on the wearing conditions of the ophthalmic lens.

According to such embodiment, each of the subset of gaze direction is comprised within the frame contour. Indeed, comparing the optical functions of the ophthalmic lenses is the most relevant within the frame contour.

According to an embodiment of the invention, at least one subset of gaze direction comprises gaze directions in the vicinity of the central vision of the wearer when wearing the ophthalmic lenses in the specific wearing conditions.

For example, when the ophthalmic lenses are a progressive addition lenses, at least one of the subset of gaze direction may comprise gaze directions in the vicinity of the meridian line. The meridian line may be defined as the locus of the intersection of the main gaze direction with the surface of the lens, when the ophthalmic lens is disposed in front of the eye of a wearer.

Figure 12:
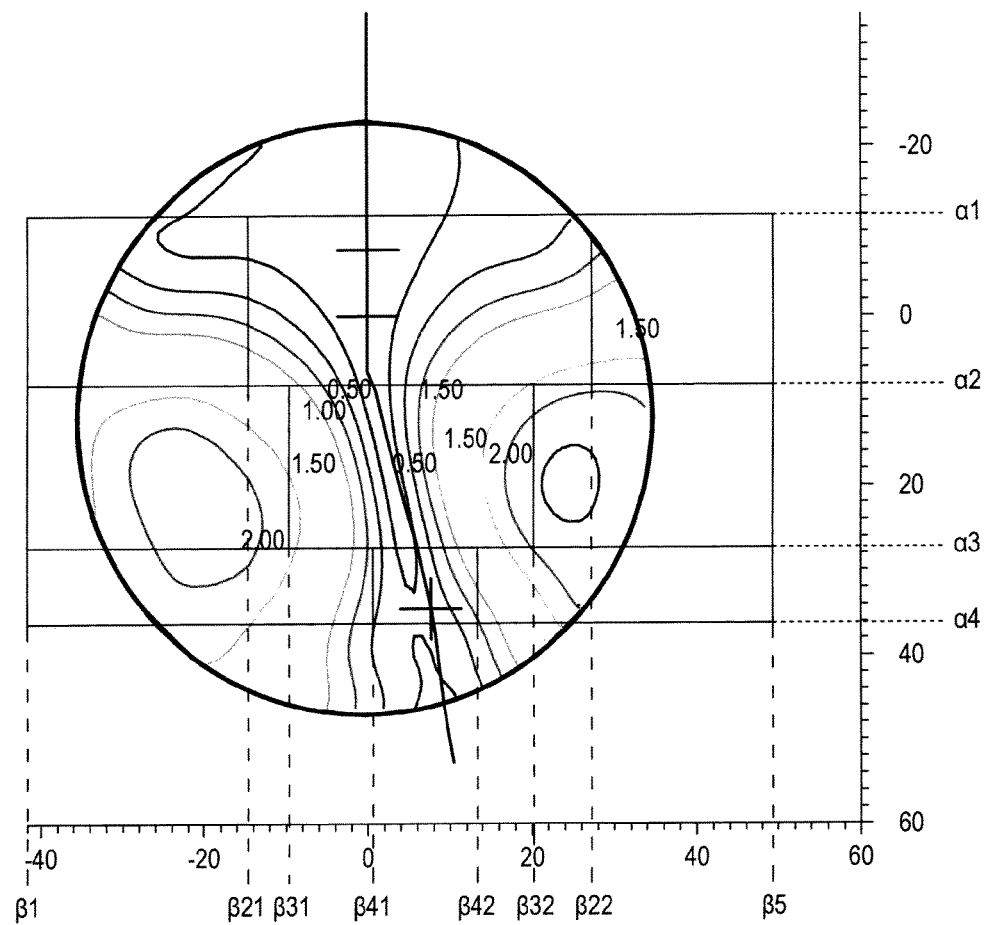
FIG. 12 is an illustration of the unwanted astigmatism for the subsets gaze directions according to an embodiment of the invention, the gaze directions are expressed in an optical systems of the eye and the lens illustrated on FIGS. 3 and 4.

FIG. 12 provides an example of nine subsets of gaze direction defined for an progressive addition lenses.

In the example of FIG. 12, the subsets are defined based on limits of gaze directions.

The first subset comprises the gaze directions for which the lowering angle α is comprised between α1 and α2 and the azimuth angle β is comprised between β1 and β21.

The second subset comprises the gaze directions for which the lowering angle α is comprised between α1 and α2 and the azimuth angle β is comprised between β21 and β22.

The third subset comprises the gaze directions for which the lowering angle α is comprised between α1 and α2 and the azimuth angle β is comprised between β22 and β5.

The fourth subset comprises the gaze directions for which the lowering angle α is comprised between α2 and α3 and the azimuth angle β is comprised between β1 and β31.

The fifth subset comprises the gaze directions for which the lowering angle α is comprised between α2 and α3 and the azimuth angle β is comprised between β31 and β32.

The sixth subset comprises the gaze directions for which the lowering angle α is comprised between α2 and α3 and the azimuth angle β is comprised between β32 and β5.

The seventh subset comprises the gaze directions for which the lowering angle α is comprised between α3 and α4 and the azimuth angle β is comprised between β1 and β41.

The eighth subset comprises the gaze directions for which the lowering angle α is comprised between α3 and α4 and the azimuth angle β is comprised between β41 and β42.

The ninth subset comprises the gaze directions for which the lowering angle α is comprised between α3 and α4 and the azimuth angle β is comprised between β42 and β5.

α1 is comprised between αFV−4° and −15° with αFV the lowering angle of the far vision reference point.

α2 is comprised between αFC+2° and +8° with αFC the lowering angle of the fitting cross.

α3 is comprised between αAdd85−10° and αAdd85+10° with αAdd85 the lowering angle corresponding to 85% of the addition of the progressive addition lens.

α4 is comprised between αNV+2° and +10° with αNV the lowering angle corresponding to the near vision reference point.

β1 is comprised between −40° and −60°.

β21 is comprised between βFV−10° and −30° with βFV the azimuth angle of the far vision control point.

β22 is comprised between βFV+10° and +30° with βFV the azimuth angle of the far vision control point.

β31 is comprised between βFV−10° and −20° with βFV the azimuth angle of the far vision control point.

β32 is comprised between βFV+10° and +20° with βFV the azimuth angle of the far vision control point.

β41 is comprised between βNV−5° and −30° with βNV the azimuth angle of the near vision control point.

β42 is comprised between βNV+5° and +30° with βNV the azimuth angle of the near vision control point.

β5 is comprised between +40° and +60°.

The subsets illustrated on FIG. 12 are only provided as an example of subset that the inventors have found to be particularly relevant.

During the comparison step S4, the first and second optical function are compared. In particular for each subset of gaze directions the value of first and second optical function are compared using a comparison function associated with said optical parameter.

The comparison function may be selected specifically for a given optical parameter.

According to an embodiment of the invention, the comparison function is a monotonically increasing function of the difference between the first and second optical functions.

According to preferred embodiment of the invention, during the comparison step S5, each subset of gaze directions the value of the optical parameter of the first and second optical function are compared using:

a. $Ccomp = Ceval[|Pj((\alpha i,\beta i);L1) - Pj((\alpha i,\beta i);L2)|]$, or b. $Ccomp = |Ceval[Pj((\alpha i,\beta i);L1)] - Ceval[Pj((\alpha i,\beta i);L2)]|$ wherein Ceval is selected among the standard deviation function, the mean function, the peak to valley function, the maximum function and the Root Mean Square function.

During the assignment step S5, a subset status is assigned to each subset of gaze directions defined in the subsets determining step S3. The subset status are based on the comparison of the value of the comparison function with at least two threshold values T1 and T2 associated with the at least one optical parameter and the comparison function. Finally, the subset status is selected among at least three levels.

Typically, for each subset of gaze directions, one may defined the two compared optical functions as:
- "identical" when the comparison value is smaller than or equal to the first threshold value T1,
- "different" when the comparison value is greater than or equal to the second threshold value T2, and
- "intermediate" when the comparison value is comprised between the first T1 and the second T2 threshold values.

Advantageously, the threshold values may be adapted based on the optical parameter and/or the comparison function, and/or physiologic criteria and/or wearing conditions.

The method may further comprise a global status assignment step during which a global status is assigned for the set of gaze directions, the global status being dependent on each of the subsets status according to a predetermined rule.

For example, to determine the global status of an opthalmic lens one may define a first set of gaze directions corresponding to the central vision of the wearer and a second set of gaze directions corresponding to the lateral vision of the wearer.

The optical parameter may be the optical power and the comparison function may be ΔOP define as the average difference between the optical power at the different gaze directions of each set of gaze direction and a reference point. Two threshold values may be defined for each set of gaze directions.

In the first set of gaze directions, one may define a three level status according to the following rules:
- OK if ΔOP is smaller than T1C,
- INTER if ΔOP is greater than T1C and smaller than T2C, and
- KO if ΔOP is greater than T2C.

In the second set of gaze directions, one may define a three level status according to the following rules:
- OK if ΔOP is smaller than T1L,
- INTER if ΔOP is greater than T1L and smaller than T2L, and
- KO if ΔOP is greater than T2L.

A global stastus may be determined based on the status of each set of gaze directions for example according to the following predetermined rule:
- OK if the status of both the first and second sets of gaze directions are OK
- OK if the status of one of the first and second sets of gaze directions is OK and the status of the other is INTER, and
- KO if the status of one of the first and second sets of gaze directions is KO.

In case the status of both the first and second sets of gaze directions are INTER, the global status is set at OK or KO according to a predetermined rule. For instance, if the method is used for checking the quality of manufactured lens, the rule may depend on the required quality level. Thus, if the required quality level is high, the global status is KO. For the other required quality level, the global status may be set at OK.

Thus, the method according to the invention allows advantageously an objective comparison of two ophthalmic lenses based on at least one optical parameter in a set of gaze directions. Therefore, the method according to the invention is independent of human factor and allows comparing two ophthalmic lenses from a wearer's point of view.

More particularly, the invention provides an objective method for comparing at least two ophthalmic lenses zone-by-zone and not point-by-point allowing simplifying the analysis by including a limited number of status which can be combined to get a global status for the ophthalmic lenses.

Furthermore, the method according to the invention overcomes the sampling. Indeed, in the case of a point-by-point analysis, there could be 10 points that exceed a given threshold, with a given sampling, and 100 points that exceed the same given threshold, with another given sampling, although it is the same lenses.

Such a method according to the invention based on a zone-by-zone comparison has also the advantage of giving an overall assessment while a point-by-point analysis does not allow it. Indeed, for example, with a method based on point-by-point comparison, one would not easily distinguish two lenses which have the same number of points exceeding a threshold, but distributed differently.

The method according to the invention allows to obtain a result of particularly relevant since the zones to be compared are set appropriately on the lenses to compare.

The invention has been described above with the aid of embodiments without limitation of the general inventive concept.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method, implemented by a computer configured to compare a first ophthalmic lens with a second ophthalmic lens, the method comprising:
   providing a first optical function of a first ophthalmic lens, the first optical function comprising at least a first set of values of an optical parameter of the first ophthalmic lens in a set of gaze directions;
   providing a second optical function of a second ophthalmic lens, the second optical function comprising at least a second set of values of the optical parameter of the second ophthalmic lens in the set of gaze directions;
   selecting at least a first subset and a second subset of gaze directions within the set of gaze directions, each subset of gaze directions comprising at least two gaze directions specific only to said subset;
   for each subset of gaze directions, comparing the values of the optical parameter of the first and second optical functions to each other using a comparison function associated with said optical parameter; and
   assigning a subset status to each subset of gaze directions, the subset status being based on a comparison of the value of the comparison function with at least two threshold values associated with said optical parameter, the subset status being selected among at least three levels.

2. The method according to claim 1, wherein the optical parameter is selected from one of a wearer power, oblique astigmatism, an unwanted astigmatism, distortion, magnification, prismatic deviation, and acuity loss.

3. The method according to claim 1, wherein the first and second optical functions are wearer optical functions defined in specific wearing conditions, and the gaze directions are defined from the center of rotation of the eye of the wearer.

4. The method according to claim 1, wherein the first and second optical functions are wearer optical functions defined in specific wearing conditions, and the optical parameter is a binocular optical parameter.

5. The method according to claim 1, wherein the at least first and second subsets of gaze directions comprise no common gaze directions.

6. The method according to claim 1, wherein the comparison function is a monotonically increasing function of the difference between the first and second optical functions.

7. The method according to claim 1, wherein during the comparing, for each subset of gaze directions, the value of the optical parameter of the first and second optical function are compared using:

a. $Ccomp = Ceval[|Pj((\alpha i, \beta i); L1) - Pj((\alpha i, \beta i); L2)|]$, or b. $Ccomp = Ceval[Pj((\alpha i, \beta i); L1)] - Ceval[Pj((\alpha i, \beta i); L2)]|$, wherein Pj is the optical parameter, $\alpha i$, $\beta i$ is the set of gaze directions, L1 is the first ophthalmic lens, and L2 is the second ophthalmic lens, and
   wherein Ceval is selected from the standard deviation function, the mean function, the peak to valley function, the maximum function, and the Root Mean Square function.

8. The method according to claim 1, wherein at least one of the first and second lenses are configured to be worn by a wearer.

9. The method according to claim 1, wherein each of the first and second lenses are virtual lenses.

10. The method according to claim 1, further comprising assigning a global status for the set of gaze directions, the global status being dependent on each of the subset statuses according to a predetermined rule.

11. The method according to claim 1, further comprising providing a frame contour, each of the subsets of gaze directions being comprised within the frame contour.

12. The method according to claim 1, wherein at least one subset of gaze direction comprises gaze directions in the vicinity of a central vision zone.

13. The method according to claim 1, wherein the first and second ophthalmic lenses are progressive addition lenses, and at least one subset of gaze directions comprises gaze directions in the vicinity of the meridian line.

14. The method according to claim 1, wherein each of the gaze directions of the set is associated to one subset of gaze directions.

15. A lens ordering system comprising:
   a processor configured to implement the comparing method according to claim 1; and
   a display configured to display the comparison result.

16. The method according to claim 2, wherein the first and second optical functions are wearer optical functions defined in specific wearing conditions, and the gaze directions are defined from the center of rotation of the eye of the wearer.

17. The method according to claim 2, wherein the first and second optical functions are wearer optical functions defined in specific wearing conditions, and the optical parameter is a binocular optical parameter.

\* \* \* \* \*